July 14, 1942.                A. T. RIEDI                2,289,592
                         FISHING POLE MOUNTING
                  Filed July 23, 1940         2 Sheets-Sheet 1
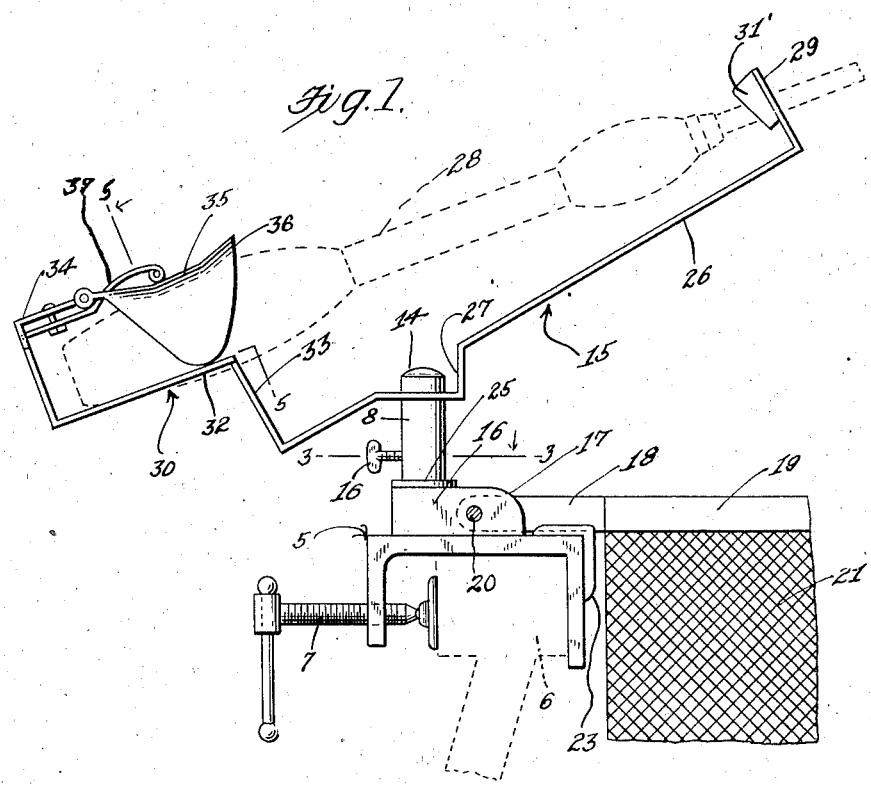
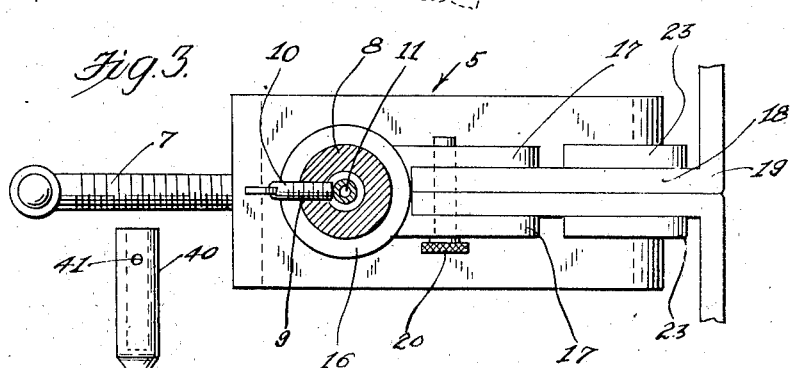
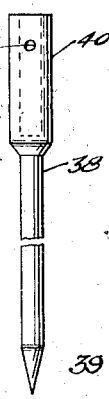
Inventor
Arnold T. Riedi
By  Clarence A. O'Brien
Attorney July 14, 1942.  A. T. RIEDI  2,289,592
FISHING POLE MOUNTING
Filed July 23, 1940   2 Sheets-Sheet 2
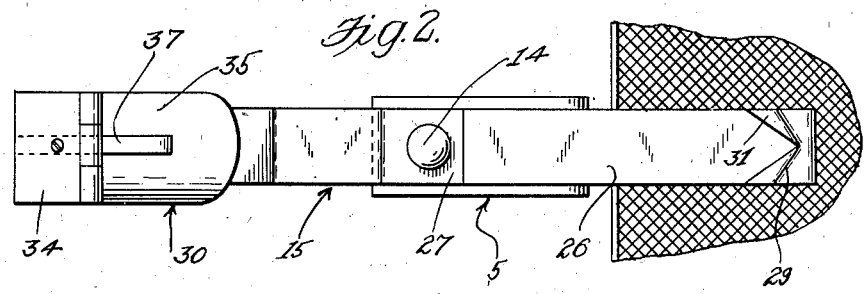
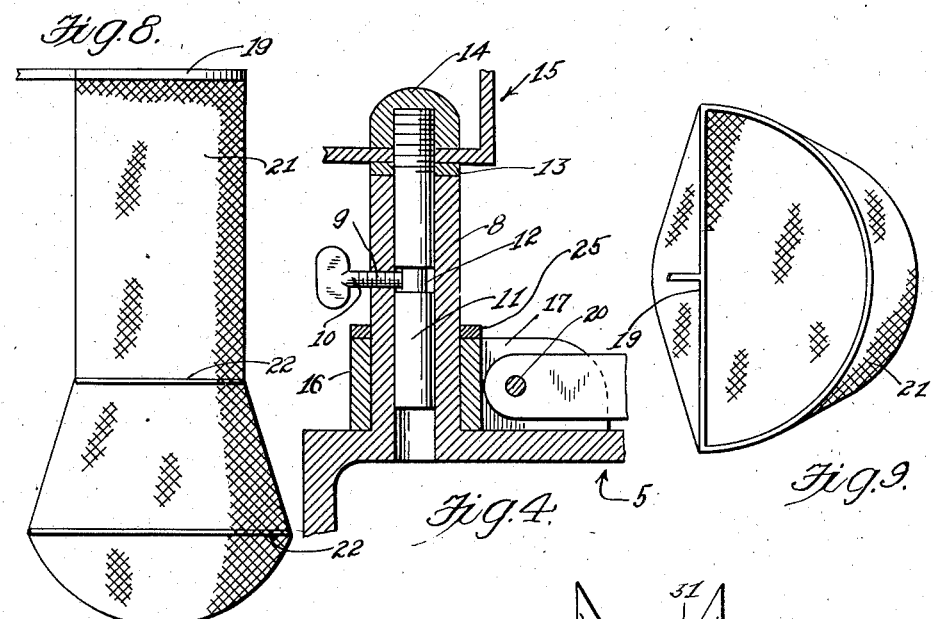
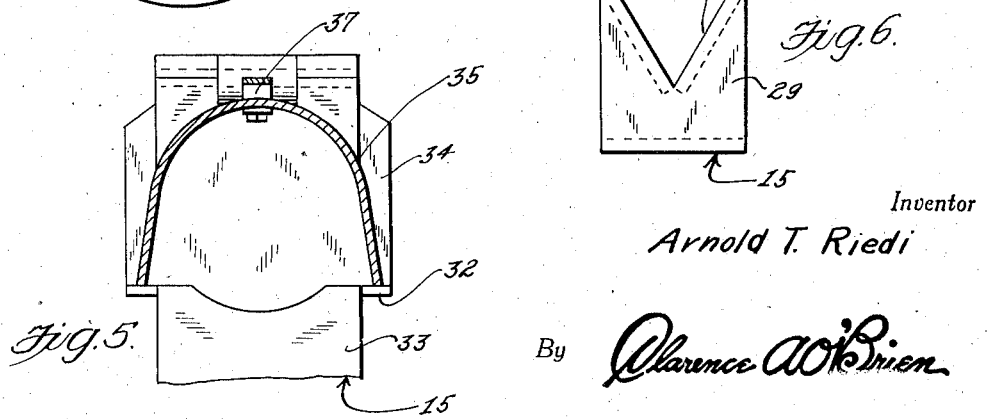
Inventor
Arnold T. Riedi
By Clarence A. O'Brien
Attorney Patented July 14, 1942

2,289,592

UNITED STATES PATENT OFFICE 2,289,592

FISHING POLE MOUNTING

Arnold T. Riedi, Dubuque, Iowa

Application July 23, 1940, Serial No. 347,026

1 Claim. (Cl. 248—42)

This invention relates to a fishing pole and fish net mounting, and has for the primary object the provision of an efficient and inexpensive device of this character which will efficiently support a fishing pole in proper position for different kinds of fishing, such as still fishing, trolling and the like and also will support the fish net in the water when desired and permit it to be conveniently moved out of the water into a boat when desired, the construction of the device being such that either the fishing pole or the net may be rotated in a complete circle and secured against rotation when desired.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a fragmentary side elevation illustrating a fishing pole and fish net mounting constructed in accordance with my invention.

Figure 2 is a fragmentary top plan view illustrating the device.

Figure 3 is a sectional view taken on the line 3—3 of Figure 1.

Figure 4 is a fragmentary vertical sectional view illustrating a portion of the mounting.

Figure 5 is a detail sectional view taken on the line 5—5 of Figure 1.

Figure 6 is an end view showing one end of the pole holder.

Figure 7 is a side elevation, illustrating a supporting pin.

Figure 8 is a side elevation, illustrating the fish net.

Figure 9 is a top plan view illustrating the fish net.

Referring in detail to the drawings, the numeral 5 indicates a U-clamp employed for mounting the present invention on the side or gunwale of a boat, a fragmentary portion of which is indicated by the chracter 6. The U-clamp 5 includes a clamping bolt 7.

Formed integrally with the U-clamp is a vertically arranged sleeve 8 provided with a screw threaded opening 9 to receive a set bolt 10. A stem 11 is rotatably mounted in the sleeve 8 and includes an annular groove 12 to receive the set bolt 10 for rotatably securing and locking the stem 11 in the sleeve against rotation. The upper end of the stem is screw threaded to receive thereon a washer 13 which rests upon the upper end of the sleeve and a nut 14 for detachably securing on the upper end of the stem a pole holder 15.

A cuff 16 is journaled on the sleeve 8 and includes spaced ears 17 between which is received and pivoted thereto a shank 18 of a net supporting hoop 19. The shank 18 is detachably and pivotally connected to the ears 17, as shown at 20. The hoop 19 is of half round shape and has removably mounted thereon a fish net or bag 21 including a series of hoops 22 similarly shaped to the hoop 19 for supporting the bag or net throughout its length and it is preferable that the latter be slightly larger toward its lower end than its mouth or upper end so as to accommodate a large number of fish without crowding. When the net or bag is in use for supporting fish within the water the shank 18 of the hoop 19 rests upon the U-clamp, the latter being provided with spaced reinforcing ribs 23 between which is located the shank 18 to prevent the cuff 16 from rotating on the sleeve 8. However, this construction will permit the bag or net to be swung upwardly and rotated about the sleeve 8 to assume a position within the boat. When the bag or net is arranged in the water the flat side thereof is disposed next to the side or gunwale of the boat so as to be convenient for placing fish therein.

A collar 25 is secured on the sleeve 8 to prevent the cuff 16 from sliding upwardly on the sleeve.

The fishing pole holder 15 includes a substantially straight member 26 which has a stepped portion 27 apertured to receive the stem 11 and rests on the washer 13 of the sleeve 8. The stepped portion 27 arranges the member 26 at a desired angle with respect to the vertical plane of the sleeve 8 and stem 11 so that the pole indicated by the character 28 carried by the holder will be arranged at a proper inclination for fishing from the boat.

The fishing pole holder 15 further includes end portions 29 and 30. The end portion 29 is arranged at right angles to the member 26 and is provided with a substantially V-shaped notch 31 provided with marginal flanges 31' to form rests for the fishing pole 28 and is capable of efficiently accommodating poles of different diameters.

The end portion 30 includes right angularly arranged members 32 and 33. The member 33 is integral with the member 26 and is disposed at right angles thereto. The end portion 30 further includes an L-shaped member 34 integral with the member 32 and coactive therewith in forming a seat for a hand grip of the fishing pole 28. The members 32 and 33 are provided with depressions to receive the hand grip.

A clamp 35 is hinged on the member 34 and is of substantially U shape in cross section to coact with the member 32 in gripping the hand grip of the pole. The clamp 35 has one edge thereof flared, as shown, at 36, to facilitate the insertion of the hand grip of the pole under the clamp. A leaf type spring 37 engages the clamp to urge the latter into clamping position or against the member 32 of the end portion 30. The leaf spring 37 is secured on the member 34. The clamp 35 will grip the fishing pole sufficiently to prevent turning thereof and consequently maintain the reel of the pole in proper position for convenient operation.

The portion 33 also forms an efficient hand grip to permit a person to readily grip the holder for rotating the same about the sleeve 8 when the set bolt 10 is released. However, the set bolt may be turned tightly against the stem for securing the holder in a set position. This construction permits the fishing pole to be rotated in a complete circle and secured in any of its adjusted positions.

By employing a construction of this kind will permit different types of fishing to be carried out from a boat such as trolling or still fishing.

However, when it is desired to employ the pole holder 15 on land, a member 38 may be employed in lieu of the U clamp. The member 38 has a sharpened end 39 to facilitate the insertion thereof into the ground while the opposite end is provided with a socketed portion 40 to receive the stem 11 and also is provided with a screw threaded opening 41 to receive the set bolt 10 for locking the stem 11 for rotation in the socketed end of the member 38.

While I have shown and described the preferred embodiment of my invention, it will be understood that minor changes in construction, combination and arrangement of parts may be made without departing from the spirit and scope of the invention as claimed.

Having thus described the invention, what I claim is:

In a fishing pole support, an upstanding socket, a pin rotatable in the socket, an annular groove in the pin, a retaining pin engaged in the groove, an elongated metallic member including end portions and a connecting portion, said connecting portion having an opening receiving the upper end of the rotatable pin, a nut securing the connecting portion on the rotatable pin, one of said end portions of the member extending at right angles to said connecting portion and having flanges struck therefrom to provide a V-shaped bifurcation with said flanges arranged in converging relation to coact with the bifurcation in providing a rest for a fishing pole, said other end portion being of substantially U-shape to receive a handle of the fishing pole and offset from the plane of the connecting portion, the bight portion of said U-shaped end forming an abutment for the rear end of the pole, a spring influenced clamp pivotally mounted on the latter-named end portion to coact therewith in gripping the handle of the pole, said clamp being of inverted U-form in cross section for enclosing the sides and top of the handle, said connecting portion in the region of its connection to the rotatable pin being offset with a part of the offset disposed at an angle to the remaining part of the connecting portion to extend upwardly at an angle to the socket.

ARNOLD T. RIEDI.